Patented Dec. 10, 1929

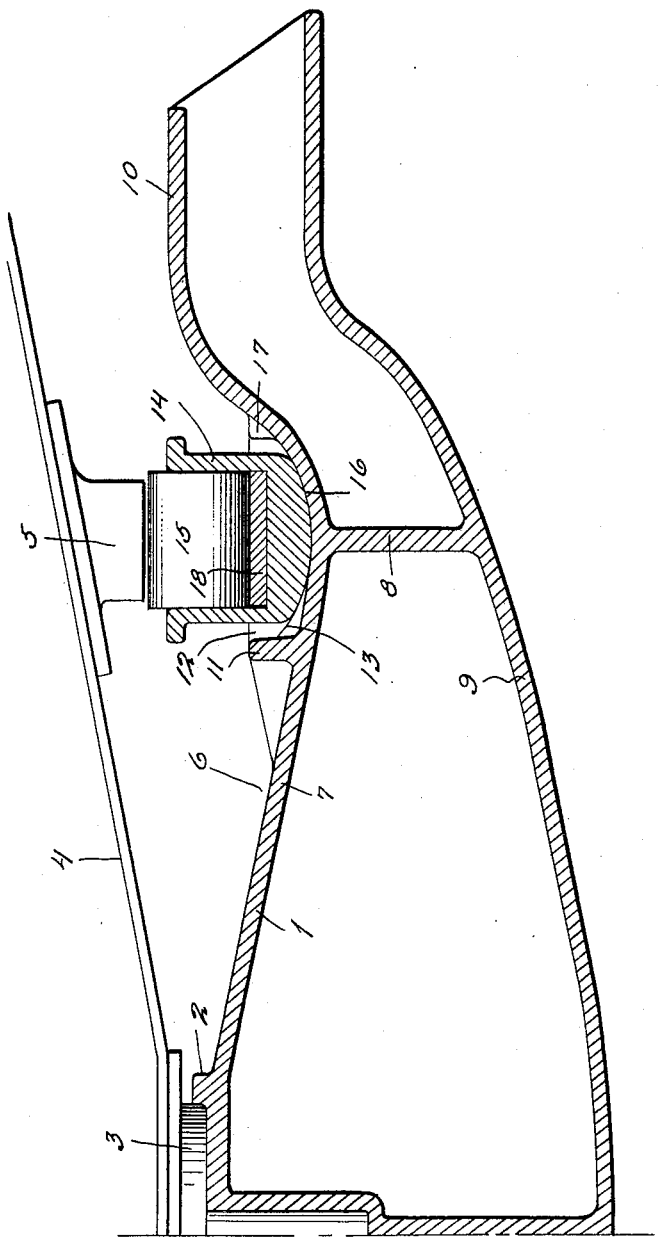

1,739,389

UNITED STATES PATENT OFFICE

PERCY R. DRENNING, OF BALTIMORE, MARYLAND, ASSIGNOR TO T. H. SYMINGTON & SON, INC., OF BALTIMORE, MARYLAND, A CORPORATION OF MARYLAND

BOLSTER WITH SELF-EQUALIZING SIDE BEARINGS

Application filed April 30, 1927. Serial No. 187,838.

The invention relates to bolsters for railway car trucks.

The principal object of the invention, generally stated, is to provide a truck bolster having means thereon for supporting side bearings in such manner that they may be capable of adjusting or equalizing themselves with respect to their seats and the depending bearing elements carried by the car body bolster.

An important object of the invention is to provide a bolster and side bearing preferably so related to the body bolster and bearing elements thereon that at least the major portion of the load will be sustained by the usual center bearing and center plate, the side bearings coming principally into play in case of any tendency of the car body to rock or sway though it is conceivable that the arrangement may be such that the load will be more or less equally divided between the center bearing and center plate and the side bearing structures, these variations depending upon the nature of the service in which the car is to be used, the contemplated weight of the load, the character of the car and truck, and other considerations.

Another important object is to provide a truck bolster so constructed and arranged as to permit the use of a side bearing roller of greater diameter than is ordinarily possible, the bolster being so shaped as to permit this, but being, notwithstanding, free from openings or abrupt depressions such as pockets or the like, the provision of which might tend to have a weakening effect on the bolster itself and resulting in the necessity for employing a much heavier construction which might preclude interchangeability with bolsters of standard pattern, such interchangeability or replacement being one of the distinctive features of the present invention.

Another object is to provide a bolster embodying the above characteristics and at the same time capable of having used in conjunction therewith side bearing rollers of different types and somewhat different means for maintaining or retaining the rollers in their proper operative relation to the side bearing elements which depend from the body bolster.

Yet another object is to provide a truck bolster having a seat of curved form for cooperation with a substantially corresponding curved bottom surface on a roller carrier, the carrier being consequently able to shift bodily and accommodate itself to the line of the load brought upon it to insure a line contact between the roller and the cooperating bearing element depending from the body bolster, application of undue strain upon either end of the roller or upon any relatively small local area being consequently avoided.

A still further object is to provide a bolster and side bearing structure of this character in which the parts will remain in assembled relation without any necessity for the employment of securing devices, the weight acting to prevent displacement of the parts in service.

An additional object of the invention is the provision of a structure of this character which will be very simple and inexpensive to manufacture, easy to assemble and install in a truck, positive in action, efficient and durable in service, and a general improvement in the art.

With the above and other objects and advantages in view, the invention preferably consists in the details of construction and the arrangement and combination of parts to be hereinafter more fully described and claimed, and illustrated in the accompanying drawing in which:

The figure is a vertical longitudinal section through a truck bolster constructed in accordance with and embodying the invention.

Referring more particularly to the drawing, the numeral 1 designates, generally, the truck bolster which is here represented as provided with the usual center bearing 2 which supports the center plate 3 carried by the body bolster 4, there being usually a king pin connection so that relative swivelling movement of the truck and body bolsters may take place as is necessary when the car travels over curved track. The body bolster is of course provided with the usual or any preferred depending bearing elements 5 located somewhat near but inwardly of the ends.

In accordance with the present invention, it may be the intention that the load be sustained entirely or only partially at the center bearing and the former arrangement is illustrated inasmuch as it is considered immaterial as to which plan is followed. In an arrangement such as that indicated it is generally customary to provide side bearings located between the end portions of the truck and body bolsters and embodying rockers or rollers for the purpose of supporting the body bolster during swivelling movement thereof with respect to the truck bolster. However, very frequently the side bearings embody rollers of rather small diameter inasmuch as there is generally a more or less constricted space between the truck and body bolsters available for the mounting of the side bearing rollers. As small rollers are undesirable for various reasons, one of which is that they do not necessarily roll sufficiently freely, it has been proposed to form the truck bolster with pockets carrying the side bearing rollers, or to construct the body bolster with recesses receiving the rollers. While such arrangements may be in themselves perfectly satisfactory, I have conceived a structure wherein such pockets will be unnecessary, and in carrying out the inventive thought I form the top of the truck bolster, near each end portion, with a gradual downward offset 6, the top wall 7 being, nevertheless, unbroken or continuous and free from openings or recesses. To provide strength at the offset, there may be provided a vertical web 8 merging into the bottom 9 of the bolster and into the underside of the top wall 7. Beyond the gradual depression or offset, the bolster has its end portions 10 more abruptly curved and extended outwardly in a substantially horizontal direction, these extensions being adapted for location within the window opening of the truck side frames in the usual manner. The downward offset will of course greatly increase the distance between the body and truck bolsters as indicated in the drawing so that larger rollers than customary may be employed.

It is preferable to provide the top wall 7 of the bolster with upstanding ribs or flanges 11 at the downward offset portions and inwardly of the end extensions 10, these flanges extending transversely of the truck bolster and merging into other flanges 12 which extend longitudinally of the bolster and which, in turn, merge into the top wall 7 near the end extensions 10. Within the confines of these flanges 11 and 12 the top surface of the bolster is curved in a manner such as that illustrated to form seats 13 upon which are mounted carriers or retainers 14 having rollers 15 mounted therein. In the present instance the rollers are shown as at least substantially cylindrical though this is not necessarily the case. Furthermore, each carrier 14 may contain a single roller or a plurality thereof, as preferred. Of course the rollers are so located as to be disposed beneath the depending bearing elements 5 carried by the body bolster. The carriers 14 have their bottom surfaces 16 curved and preferably conforming to the curvature of the seats 13 so as to be capable of shifting bodily in one direction or the other so as to bring about a flat or line bearing between the rollers and the bearing elements 5, the carriers being thus self-adjusting or equalizing and the bringing of any undue pressure upon an end of the roller or any part of the surface of the carrier and seat being avoided. Clearly, longitudinal displacement of the rollers with respect to the carriers will be prevented by the upstanding sides of the latter. Excessive bodily shifting of the carriers will be prevented inasmuch as the flanges 11 act as stops for limiting movement thereof toward the vertical center line of the bolster. Some suitable stop means may also be provided for limiting outward movement and in the present instance this is represented as comprising webs or lugs 17 formed at or near the junctures of the flanges 12 with the top of the bolster. Within the limits defined by the flanges 11 and webs 17 the carriers may rock, slide or otherwise move to accommodate themselves to existing conditions.

To save the carriers from wear it may be advisable to place therein wear plates 18 located beneath the rollers 15 and these wear plates may be readily replaced when excessively worn. Furthermore, if it is desired to maintain constant contact of the rollers with the depending bearing elements 5 thicker wear plates or auxiliary shims may be provided for the purpose of raising the rollers with respect to the truck bolster. In case it is necessary to use a smaller roller than that for which the structure is designed, a still thicker wear plate or additional ones may be inserted beneath the roller and, conversely, a larger roller may be accommodated by moving the wear plate or replacing it by a thinner one. All such adaptations and minor adjustments fall readily within the scope of the invention which consists primarily of the fundamental features above outlined.

From the foregoing description and a study of the drawing it will be apparent that I have thus provided a very simply constructed bolster which embodies all the above mentioned features of advantage and which is, in addition, capable of being used to replace one of ordinary or standard pattern without necessitating any changes or modifications in the construction of the side frames or other parts of the truck. It is really believed that the construction, operation and advantages will be readily apparent to one skilled in the art without further explanation.

While I have shown and described the preferred embodiment of the invention it should be understood that the disclosure is merely an exemplification of the principles involved and that the right is reserved to make all such changes in the form, construction and combination of the parts as will not depart from the spirit of the invention or the scope of the claims hereunto appended.

Having thus described the invention, I claim:

1. In combination, a body bolster having a center plate and depending side bearing elements, a truck bolster having a center bearing rotatably receiving the center plate, the truck bolster having its top continuous throughout and depressed inwardly of its ends to increase the distance between it and said side bearing elements, the top of the truck bolster being further formed with curved seats beneath said side bearing elements, carriers mounted upon said seats and having curved bottom surfaces substantially conforming thereto, and rollers retained within the carriers and coacting with said depending side bearing elements.

2. In combination, a body bolster having a center plate and depending side bearing elements, a truck bolster having a center bearing rotatably receiving the center plate, the truck bolster having its top continuous throughout and depressed inwardly of its ends to increase the distance between it and said side bearing elements, the top of the truck bolster being further formed with curved seats beneath said side bearing elements, carriers mounted upon said seats and having curved bottom surfaces substantially conforming thereto, and rollers retained within the carriers and coacting with said depending side bearing elements, the carriers being bodily shiftable with respect to said seats for bringing the rollers into position insuring line contacts with said depending bearing elements.

3. In combination, a body bolster having a center plate and depending side bearing elements, a truck bolster having a center bearing rotatably receiving the center plate, the truck bolster having its top continuous and imperforate throughout and depressed inwardly of its ends to increase the distance between it and said side bearing elements, the top of the truck bolster being further formed with curved seats beneath said side bearing elements, carriers mounted upon said seats and having imperforate lower portions formed with curved bottom surfaces substantially conforming thereto, rollers retained within the carriers and coacting with said depending side bearing elements, and wear plates located within the carriers beneath the rollers.

4. In combination, a body bolster having a center plate and depending side bearing elements, a truck bolster having a center bearing rotatably receiving the center plate, the truck bolster having its top continuous throughout and depressed inwardly of its ends to increase the distance between it and said side bearing elements, the top of the truck bolster being further formed with curved seats beneath said side bearing elements, a vertical web beneath the depressed portion merging thereinto and into the bottom of the truck bolster, carriers mounted upon said seats and having curved bottom surfaces substantially conforming thereto, rollers retained within the carriers and coacting with said depending side bearing elements, and wear plates located within the carriers beneath the rollers for adjusting the position thereof with respect to the depending bearing elements for preventing or providing clearance.

5. In combination, a body bolster having a center plate and depending side bearing elements, a truck bolster having a center bearing rotatably receiving the center plate, the truck bolster having its top continuous throughout and depressed inwardly of its ends to increase the distance between it and said side bearing elements, the top of the truck bolster being further formed with curved seats beneath said side bearing elements, carriers mounted upon said seats and having curved bottom surfaces substantially conforming thereto, rollers retained within the carriers and coacting with said depending side bearing elements, the carriers being bodily shiftable with respect to said seats for bringing the rollers into position insuring line contacts with said depending bearing elements, and abutment means for limiting shifting movement of the carriers longitudinally of the truck bolster.

6. In combination, a body bolster having a center plate and depending side bearing elements, a truck bolster having a center bearing rotatably receiving the center plate, the truck bolster having its top continuous throughout and depressed inwardly of its ends to increase the distance between it and said side bearing elements, the top of the truck bolster being further formed with curved seats beneath said side bearing elements, carriers mounted upon said seats and having curved bottom surfaces substantially conforming thereto, rollers retained within the carriers and coacting with said depending side bearing elements, the carriers being bodily shiftable with respect to said seats for bringing the rollers into position insuring line contacts with said depending bearing elements, and means for limiting shifting movement of the carriers longitudinally of the truck bolster, consisting of upstanding projections on the top surface of the truck bolster.

7. In combination, a body bolster having a center plate and depending side bearing elements, a truck bolster having a center bearing rotatably receiving the center plate, the truck bolster having its top continuous throughout and depressed inwardly of its ends to increase the distance between it and said side bearing elements, the top of the truck bolster being further formed with curved seats beneath said side bearing elements, carriers mounted upon said seats and having curved bottom surfaces substantially conforming thereto, rollers retained within the carriers and coacting with said depending side bearing elements, and wear plates located within the carriers beneath the rollers for adjusting the position thereof with respect to the depending bearing elements for preventing or providing clearance, and stops located at the inner and outer ends of said curved seats for limiting movement of the carriers.

8. A truck bolster having means permitting swivelling movement thereof with respect to a body bolster having depending bearing elements thereon, said truck bolster having a continuous top downwardly depressed inwardly of its ends and formed with upstanding flanges defining seat portions, carriers movably mounted upon said seat portions, and rollers movably mounted within and retained against longitudinal displacement with respect to the carriers and cooperating with the bearing elements depending from the body bolster.

In testimony whereof I affix my signature.

PERCY R. DRENNING.